US011220050B2

(12) United States Patent
Collins et al.

(10) Patent No.: US 11,220,050 B2
(45) Date of Patent: Jan. 11, 2022

(54) PRINTHEAD INDEXER

(71) Applicant: HEWLETT-PACKARD DEVELOPMENT COMPANY, L.P., Houston, TX (US)

(72) Inventors: Eric Collins, Vancouver, WA (US); Kurt F. Olsen, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 749 days.

(21) Appl. No.: 16/077,755

(22) PCT Filed: Apr. 14, 2017

(86) PCT No.: PCT/US2017/027703
§ 371 (c)(1),
(2) Date: Aug. 14, 2018

(87) PCT Pub. No.: WO2018/190871
PCT Pub. Date: Oct. 18, 2018

(65) Prior Publication Data
US 2021/0197459 A1    Jul. 1, 2021

(51) Int. Cl.
*B29C 64/232* (2017.01)
*B33Y 30/00* (2015.01)
*B33Y 50/02* (2015.01)
*B29C 64/209* (2017.01)
*B29C 64/236* (2017.01)

(52) U.S. Cl.
CPC .......... *B29C 64/232* (2017.08); *B29C 64/209* (2017.08); *B29C 64/236* (2017.08); *B33Y 30/00* (2014.12); *B33Y 50/02* (2014.12)

(58) Field of Classification Search
CPC ... B29C 64/232; B29C 64/209; B29C 64/236; B33Y 30/00; B33Y 50/02
USPC .................................................. 425/166, 375
See application file for complete search history.

(56) References Cited

U.S. PATENT DOCUMENTS

| 5,215,213 | A | * | 6/1993 | Nestler | .................. A47F 10/02 186/55 |
| 5,442,449 | A |   | 8/1995 | Stemmle et al. | |
| 6,814,907 | B1 | * | 11/2004 | Comb | ..................... B29C 48/02 264/40.7 |
| 7,311,399 | B2 |   | 12/2007 | Phillips | |
| 7,510,252 | B2 |   | 3/2009 | Conca et al. | |
| 8,210,631 | B2 |   | 7/2012 | Bailey et al. | |

(Continued)

FOREIGN PATENT DOCUMENTS

| SU | 167208 A1 | 1/1965 |
| SU | 382271 A3 | 5/1973 |
| WO | 2016170383 A1 | 10/2016 |

*Primary Examiner* — Joseph S Del Sole
*Assistant Examiner* — Lawrence D. Hohenbrink, Jr.
(74) *Attorney, Agent, or Firm* — HP Inc. Patent Department (57) ABSTRACT

Examples disclosed herein relate to printhead indexing. An example method can include rotating a crank arm connected to a coupling bar. The method can include moving a print sled translationally by the coupling bar, where the print sled may be located in X, Z, and Y orthogonal dimensions. In this example, the print sled may be translationally moved to one of a number of index positions by the coupling bar in response to rotation of the crank arm, where the number of index positions are separately located in a Y dimension with the same Z dimension.

15 Claims, 6 Drawing Sheets

(56) References Cited

U.S. PATENT DOCUMENTS

| | | |
|---|---|---|
| 9,193,183 B2 | 11/2015 | Woolfe et al. |
| 2008/0297559 A1 | 12/2008 | Codos et al. |
| 2011/0261131 A1 | 10/2011 | Eve et al. |
| 2018/0093420 A1* | 4/2018 | Roberts ................ B29C 64/106 |

* cited by examiner

PRINTHEAD INDEXER

BACKGROUND

Printheads in 2D and 3D printers can include components for printing items and images. Printers may use printing liquids in specified positions using a printhead. Ink, fusing agents, colorants and other substances can be printing liquid. The printing liquid can often flow within the pen or between print nozzles until expelled by the printhead into a space or onto a specified medium. The printing liquid may be stored in a pen that can be moved to a position based on the item to be printed.

DESCRIPTION OF THE DRAWINGS

Certain examples are described in the following detailed description and in reference to the drawings, in which.

DETAILED DESCRIPTION

The present disclosure relates to a mechanism used for indexing a printhead between different locations. As used herein, the term refers to a number of positions that a printhead may move to and indexing can refer to the movement to and from those positions. The mechanism allows a gradual starting and stopping acceleration. This feature allows the printhead to avoid de-priming issues of printing liquid caused by more jarring movements. Other features of this apparatus include a secure lock stopping point that can use springs attached to the pen sled to secure a printhead location in a single position even with the more flexible mechanism that allows gradual starting and stopping.

Printing from printheads can include jetting numerous agents via an array of thermal or piezo printhead nozzles. In an example, these nozzles may span the printhead and can be referred to as a printzone array and may span a standard page or may be another printer size for both 2D and 3D printers. The printhead can traverse across a print chamber or a build chamber to prints a cross section of fusing agent, detailing agent, colorants and other liquids with varying material properties depending on the type of printer the printhead is part of.

As discussed herein, the printhead is mounted on a carriage, which can traverse the build chamber any number of passes, and the printing can be distributed across these passes. In an example, these print passes may apply ink, substrate, fusing agent, detailing agent, and coloring agent in shingle masks. The mounting of the printhead on a carriage spans a printzone where the printzone can be stationary and avoids scanning both left to right and over a print zone.

The printhead carriage also has a mechanism to index the printhead, such that the carriage can move orthogonal to the carriage scan direction. As discussed above, to index a printhead includes setting and positioning the printhead in predetermined and repeatable positions. This indexing can be used to shift the alignment of nozzles with the print data.

Figure 1:
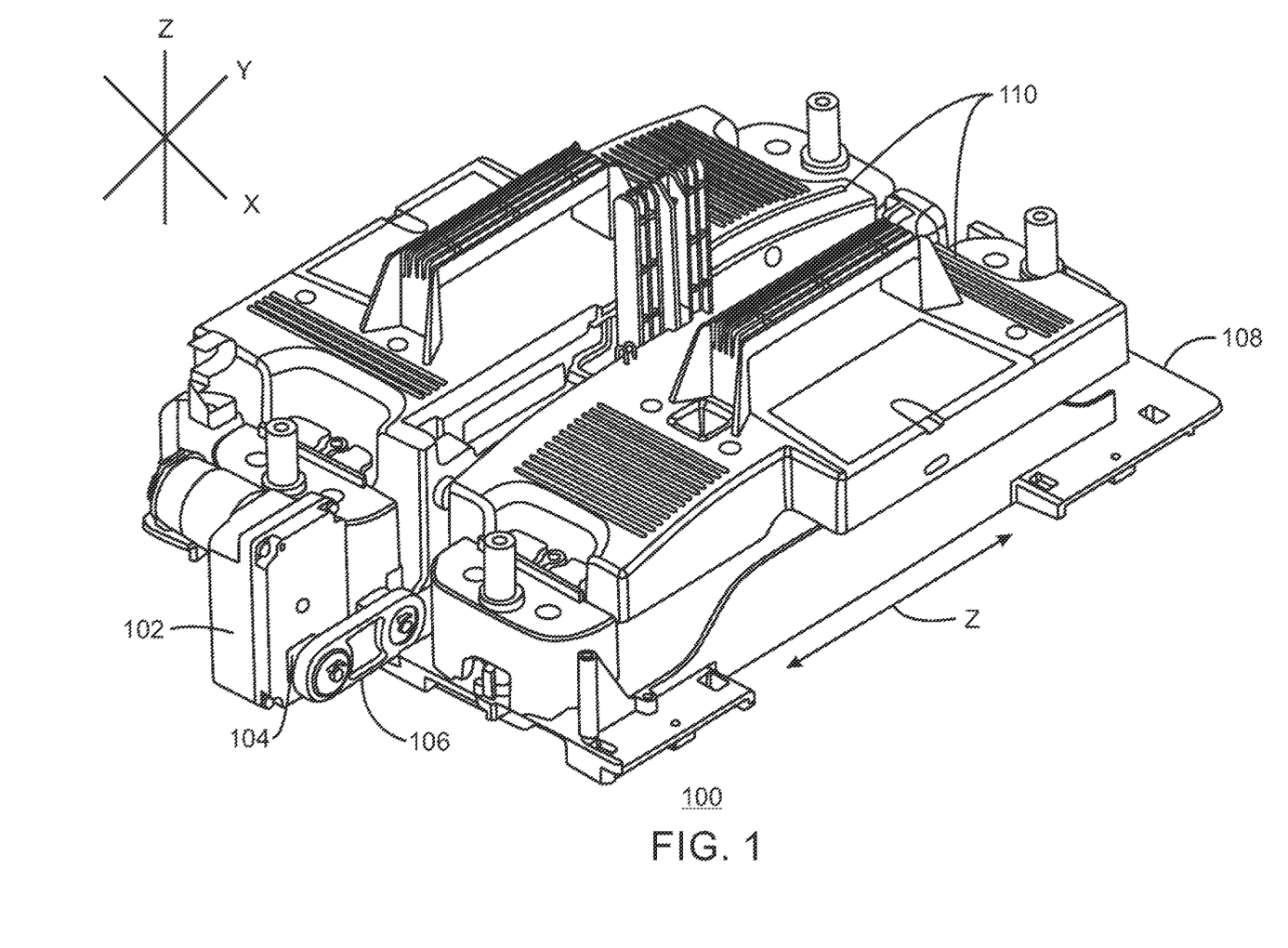
FIG. 1 is a diagram of an example device for printhead indexing.

FIG. 1 is a diagram of an example printhead indexing device 100. A compass of dimensions is shown accompanying figure one to provide an example of X, Z. and Y orthogonal dimensions for use in this specification. The printhead indexing device 100 can include a gearbox 102 to generate rotational motion and can include gears motors, servos, or other mechanisms for generating rotational motion from electrical power. The gearbox 102 can apply that rotational motion to a crank arm 104 that rotationally turns in response to the rotation motion. The crank arm may rotate to any of a number of predetermined positions based on software or hardware programing. These positions may correspond to index positions desired for a printhead indexing device 100.

The crank arm 104 may rotationally turn while attached to a coupling bar 106 which is in turn connected to a print sled 108. A print sled 110 can be a sled used for movement of nozzles in a printhead. For example, a print sled 110 may also be called a pen sled, if the print sled 110 is carrying pens. The crank arm may turn and vary its position in the Z and Y dimensions while holding its position in the X dimension constant. In an example, the crank arm is rotated against a bias holder located past top dead center in the path of rotation. By rotating against a bias holder, the crank arm can be held steady at a repeatable position.

The rotation of the crank arm 104 can be translated to a translational motion by the coupling bar 106 which can push and pull the print sled 108 in a Y dimension. The print sled may carry a pen 110 which can be used to hold and dispense printing substrate to a specific position. The dispensing of printing liquid can be through nozzles that are fed through the print sled 108 and may be separated from each other in a Y dimension. As the movement of the print sled 108 is driven by the rotation of the crank arm 104, the bias holders that the crank arm 104 is held to can result in repeatable stop position for the pens and also any print nozzles. In an example, preload springs are used to bias the crank arm 104 against the bias holders to lock the pens 110 into position and takes up any internal clearance in the bearings of the crank arm 104, gearbox 102, and coupling bar 106 assembly. In an example, the coupling bar 106 can include self-aligning bearings to compensate for misalignment between the crank arm 104 shaft and the print sled 108.

In an example, the nozzles may be printzone, in that the nozzles span the area the printhead can reach. For the printhead indexing device 100, the printzone array of nozzles may include many print dice arranged end-to-end. These print die can have subtle differences in drop size, both within the die and between dice. In an example, the alignment between end nozzles across two dies may not be as accurate as the alignment between nozzles on the same die. Using the present printhead indexing device 100 and shingle-masking hides these non-uniformities in die alignment. The indexing positions, and thus the bias holder positions on the crank arm 104 may correspond to the positions needed to account for these alignment issues between dies.

For each agent jetted out by a nozzle, the group of nozzles may be arranged in a 1×N vector. On each pass of the printhead, an M×N matrix of data is printed. If a nozzle is damaged or clogged, no agent can be printed for that raster of data. Instead, printhead indexing allows this missing data to be printed on a subsequent pass, by moving the printhead orthogonal to the carriage scan direction.

High force shock of the pen due to a fast moving printhead along a scanning or indexing direction can cause air ingestion and depriming of the nozzle firing chambers. By using the printhead indexing device 100, the printhead moves the print bar quickly while limiting the shock imparted from accelerating the print bar at the start and end of motion.

Figure 2:
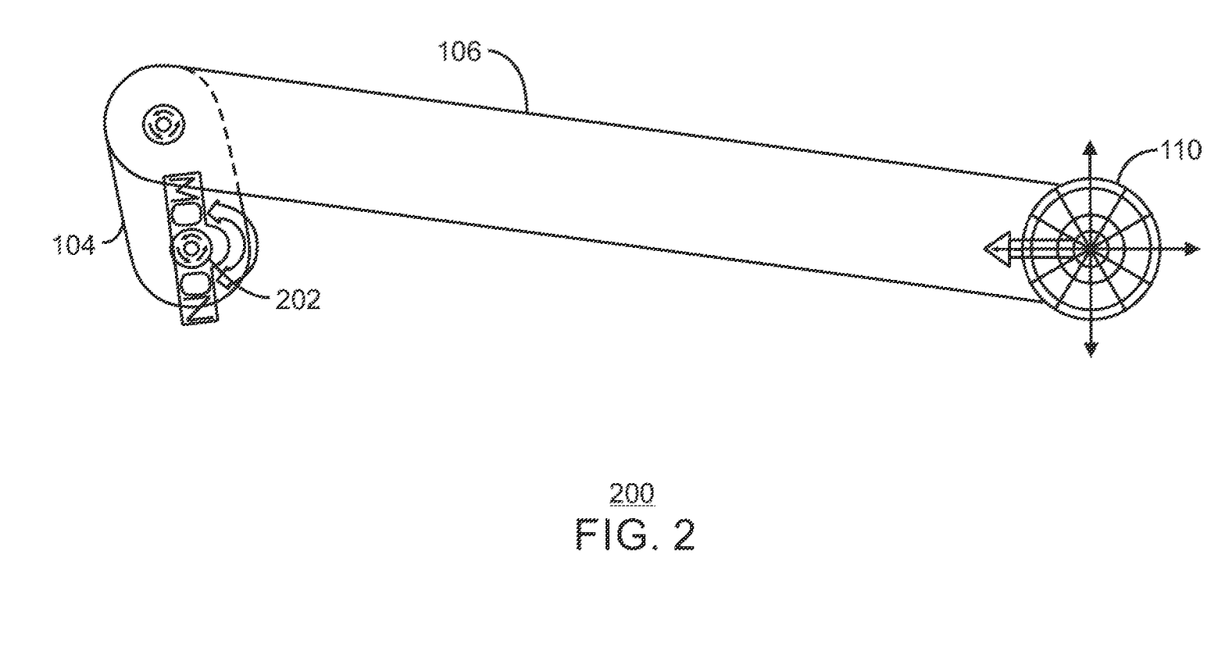
FIG. 2 is a diagram of an example cross-section of components in a printhead indexer.

FIG. 2 is a diagram of an example movement scheme 200 for components in a printhead indexer 100. Like numbered items are as described with respect to FIG. 1.

As discussed herein, the crank arm 104 can be rotated by the rotational motion generated by the gearbox 102. This rotational motion 202 may move in a single direction or may switch directions based on instructions received from a processor or print controller. The rotational motion 202 generated at the crank arm 104 is translated through the crank arm 104 to the coupling bar 106. As seen in FIG. 2, the crank arm 104 rotates in single plane that can push and pull the coupling bar 106 such that the end of the coupling bar 106 furthest from the crank arm 104 moves forward and back in a translational dimension.

The crank arm 104 rotation can convert the approximately constant angular velocity of the input motor from the gearbox to a linear motion output with a sinusoidal velocity. This translation results in a smoother velocity profile that would occur if a movement servo were directly connected to a print sled 108. The conversion of movement through the crank arm 104 and the coupling bar 106 can reduce the peak acceleration of the pens 110 and thus reduce the effects of jarring motion on a printhead moving quickly between index positions. Using the rotating crank arm 104 connected to the coupling bar 106 can limit the peak acceleration of the pens 110 and also unintended substrate movement within the pens 110. The crank arm 104 and coupling bar 106 are used together to reduce the jerk or acceleration effect on the print sled a printing fluid. The reduction of an effect of this acceleration is a low jerk force applied and felt during these indexing movements. While the system shown includes a way to apply this force in a low jerk way, another low jerk force applier can be used from the principals to reduce the effect of acceleration on the printhead.

Figure 3:
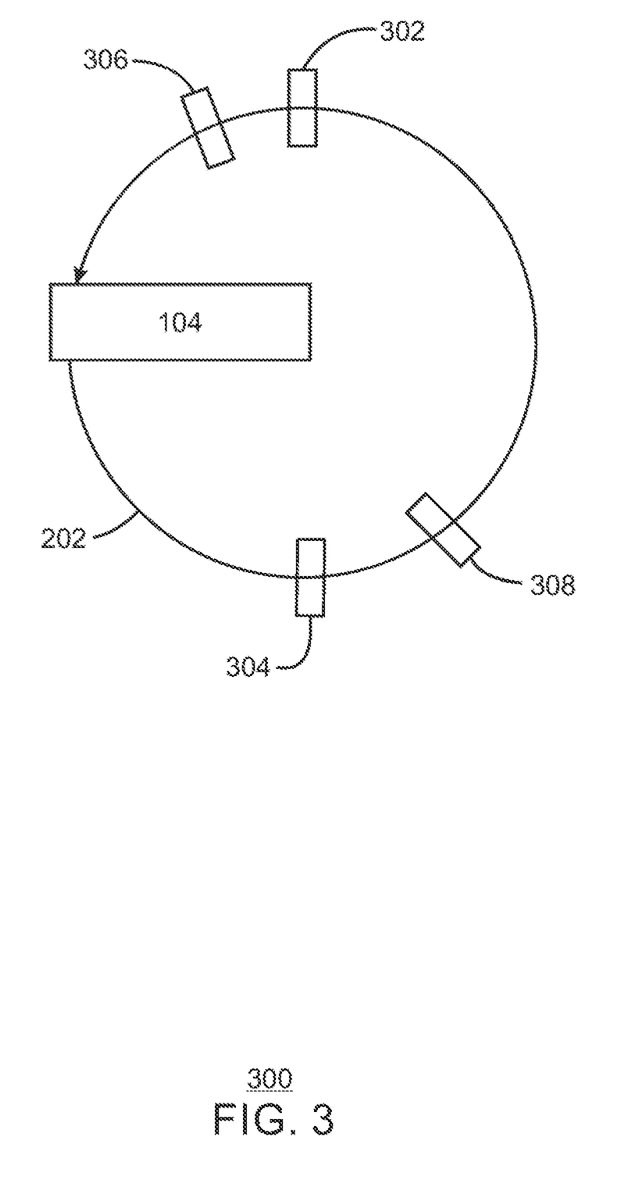
FIG. 3 is a schematic diagram of an example rotation scheme for components in a printhead indexer.

FIG. 3 is a schematic diagram of an example rotation scheme 300 for components in a printhead indexer. Like numbered items are as described in FIG. 1 and FIG. 2.

The rotation scheme 300 provides an example of how a crank arm 104 may rotate in response to instructions from a processor or print controller. The rotational movement 202 shown in one direction may, in some example, move in a second rotational direction.

The rotation scheme 300 includes a top location of rotation 302 that is located at the apex of a crank arm rotation path created by the rotational movement 202. Similarly, the rotation scheme 300 may include a bottom location of rotation 304 at the nadir of the crank arm rotation path created by the rotation movement 202 of the crank arm 104.

As discussed above, the bias holders may be used as stopping points for the crank arm 104 during its rotation. The bias holders may be physical bars, detents, notches, a movable latch or any other means of holding the crank arm 104 temporarily in a stable position. In an example, preload spring may hold the crank arm 104 against a bias holder at a first bias holder position 306. The first bias holder position 306 may correspond to a first index position of the print sled 108 and pens 110. In an example, the first bias holder position 306 may be located five degrees radially past the top location of rotation 302 in the direction of the rotation movement 202. A second bias holder position 308 may be located past the bottom location of rotation 304. The second bias holder position 308 may correspond to a second index position of the print sled 108 and pens 110. In an example, the second bias holder position 308 may be located five degrees radially past the bottom location of rotation 304 in the direction of the rotation movement 202.

In an example, the rotation movement 202 can be actuated via servo-controlled DC motor via the crank arm 104. The choice of a top location of rotation 302 and bottom location of rotation 304 for crank arm alignment minimizes potential position error, shock, and acceleration at index positions. This is due to the sinusoidal linear velocity that is output by the coupling bar 106, and specifically how the greatest taper of that velocity up and down occurs at the top and bottom of the path of rotation as these components are arranged.

In an example where a servo DC motor is used, the servo motion can be relatively constant in its acceleration with constant velocity at the motor. This relatively constant motion provides an optimal acceleration profile for the indexing mechanism to quickly complete the move at low forces. Through this technique, the crank transfer function results in constant acceleration while motor is at constant speed and enables a printhead and its nozzles to reach a new index position before starting the next print pass without depriming issues.

Figure 4:
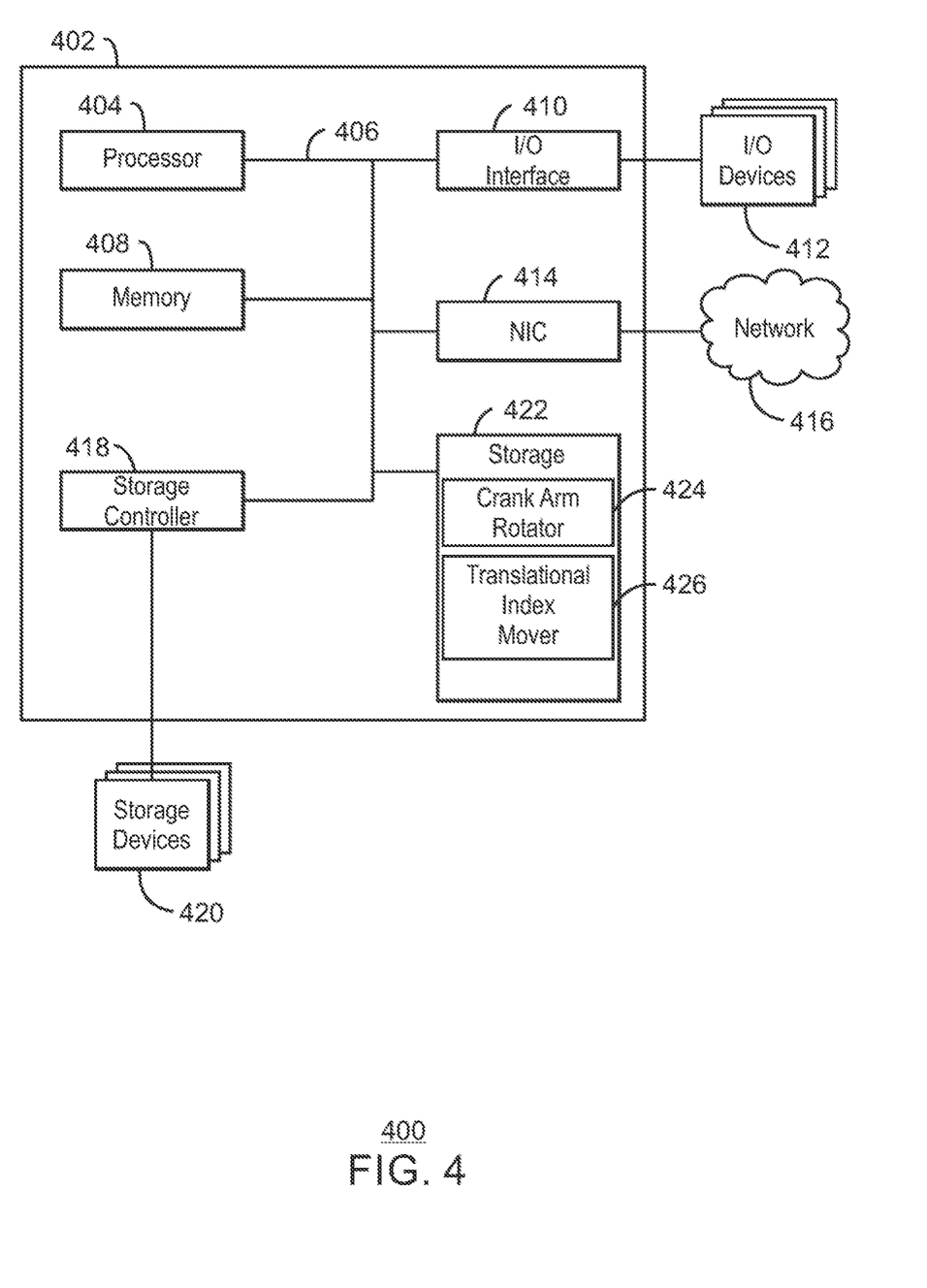
FIG. 4 is a block diagram of an example system for printhead indexing.

FIG. 4 is a block diagram of an example system 400 for printhead indexing. The computing device can be a printer or other computing device, including a print server, a desktop computer, a business server, and the like. The computing device 402 includes at least one processor 404. The processor can be a single core processor, a multicore processor, a processor cluster, and the like. The processor 404 can be coupled to other units through a bus 406. The bus 406 can include peripheral component interconnect (PCI) or peripheral component interconnect express (PCIe) interconnects, Peripheral Component Interconnect eXtended (PCIx), or any number of other suitable technologies for transmitting information.

The computing device 402 can be linked through the bus 406 to a memory 108. The system memory 408 can include random access memory (RAM), including volatile memory such as static random-access memory (SRAM) and dynamic random-access memory (DRAM). The system memory 408 can also include directly addressable non-volatile memory, such as resistive random-access memory (RRAM), phase-change memory (PCRAM), Memristor, Magnetoresistive random-access memory, (MRAM), Spin-transfer torque Random Access Memory (STTRAM), and any other suitable memory that can be used to provide computers with persistent memory. In an example, a memory can be used to implement persistent memory if it can be directly addressed by the processor at a byte or word granularity and has non-volatile properties.

The processor 404 may be coupled through the bus 406 to an input output (I/O) interface 410. The I/O interface 410 may be coupled to any suitable type of I/O devices 412, including input devices, such as a mouse, touch screen, keyboard, display, and the like. The I/O devices 412 may also be output devices such as a printhead, printer dies, indexing motors, a printer controller, and the like.

The computing device 402 can also include a network interface controller (NIC) 414, for connecting the computing device 402 to a network 416. In some examples, the network 416 can be an enterprise server network, a storage area network (SAN), a local area network (LAN), a wide-area network (WAN), or the Internet, for example.

The processor 404 can also be coupled to a storage controller 418, which may be coupled to one or more storage devices 420, such as a storage disk, a solid state drive, an array of storage disks, or a network attached storage appliance, among others.

The computing device 402 can include a tangible, non-transitory, computer-readable storage media, such as a storage 422 for the long-term storage of data, including the operating system programs and user file data.

The storage device 422 can include local storage in a hard disk or other non-volatile storage elements. While generally system information may be stored on the storage device 422, in this computing device 402, the program data can be stored in the memory 408. The storage device 422 may store instructions that may be executed by the processor 404 to perform a task.

The storage device can include a crank arm rotator 424 to rotate a crank arm connected to a coupling bar. The crank arm rotator may account for feedback received from the printer and incorporate the feedback into the directions provided to the crank arm. Through the movements of the crank arm, the position of the printhead nozzles may be adjusted, both individually and as a group.

The storage device can include a translational index mover 426 to move a print sled translationally by the coupling bar. In an example, the index positions being moved correspond to bias holder positions that can affect the range of motion of a crank arm. In an example, the translational index mover 426 may further adjust the index positions for the coupling bar and print sled. As discussed above, the print sled can be located in X, Z, and Y orthogonal dimensions and translationally moved to one of a plurality of index positions by the coupling bar in response to rotation of the crank arm. In an example, the number of index positions are separately located in a Y dimension with the same Z dimension.

In an example, the computing device 400 can direct the crank arm, coupling bar, and print sled are moved together in an X dimension. The printhead indexer directed by the computing device 400 may rotate the crank arm in a Z and Y dimension and keeps the X dimension constant. The print sled can include a plurality of print nozzles spread apart in the Y dimension. In an example the computing device 400 holds the crank arm in place with a bias holder in response to a rotation of the crank arm to the location of the bias holder. The crank arm may also be held against the bias holder with a spring.

In an example, the coupling bar may be rotated in a first direction a circular path comprising a top location of rotation and a bottom location of rotation, and wherein the coupling bar stops rotation at a location past the top location in the first direction of rotation with the coupling bar closer in location to the top location of rotation than the bottom location of rotation. The crank arm rotation can accelerate to a constant rotational velocity and causes a sinusoidal translational velocity of the print sled through the coupling bar. A number of index positions are positioned to align the print sled with a second print sled. In an example, the crank arm can rotate in a first rotational direction and then a second rotational direction.

As used herein, the indexing of positions allows a crank arm and the connected printhead assembly to repeatably and precisely position the printhead in a number of indexed positions. Further, the transfer mechanism allows the acceleration of the printhead to be minimized minimal to avoid temporarily disabling nozzles, and avoid shocking the printhead when it reaches its target position.

In an example, the rotation motion managed by the computing device 400 can be driven by a servo-controlled motor. The motor controlled by the computing device 400 can actuate a crank arm, which has a sinusoidal transfer function from motor rotation to printhead translation. Two positions along a rotational path can be used to located index positions. For example, a "top dead center" and "bottom dead center" on a rotational path may be located as above and below, respectively, a plane of desired translational movement relative to the rotational path. These locations can be matched to the two index positions, so that high speed acceleration of the motor at these positions results in slow speed and acceleration of the printhead via the sinusoidal transfer function of the crank arm and coupling bar assembly. These locations use as index positions contribute to both the lowered force felt by the movement of the servo motor as well as an increased precision in positioning at the two target positions.

A motor move profile can be constant acceleration, followed by a constant rotational speed, followed by constant deceleration. With the sinusoidal transfer function of the presently disclosed device, this results in continuous acceleration of the printhead during motion, allowing lower average acceleration for a given move completion time.

Furthermore, the computing device 400 may include a move algorithm. IN an example, a move algorithm can predicts the amount of time the pen has to complete its motion before the start of the next print pass. The computing device 400 may take this information as feedback and limit the acceleration and speed to the minimum required to complete the move In time thus lowering impact felt by the pens and other equipment in the printhead device. The computing device 400 can use software algorithms to determine when the printhead should be indexed between print passes, and ensure it arrives on time for jetting of substrate, ink, or another agent.

It is to be understood that the block diagram of FIG. 4 is not intended to indicate that the computing device 402 is to include all of the components shown in FIG. 4. Rather, the computing device 402 can include fewer or additional components not illustrated in FIG. 4.

Figure 5:
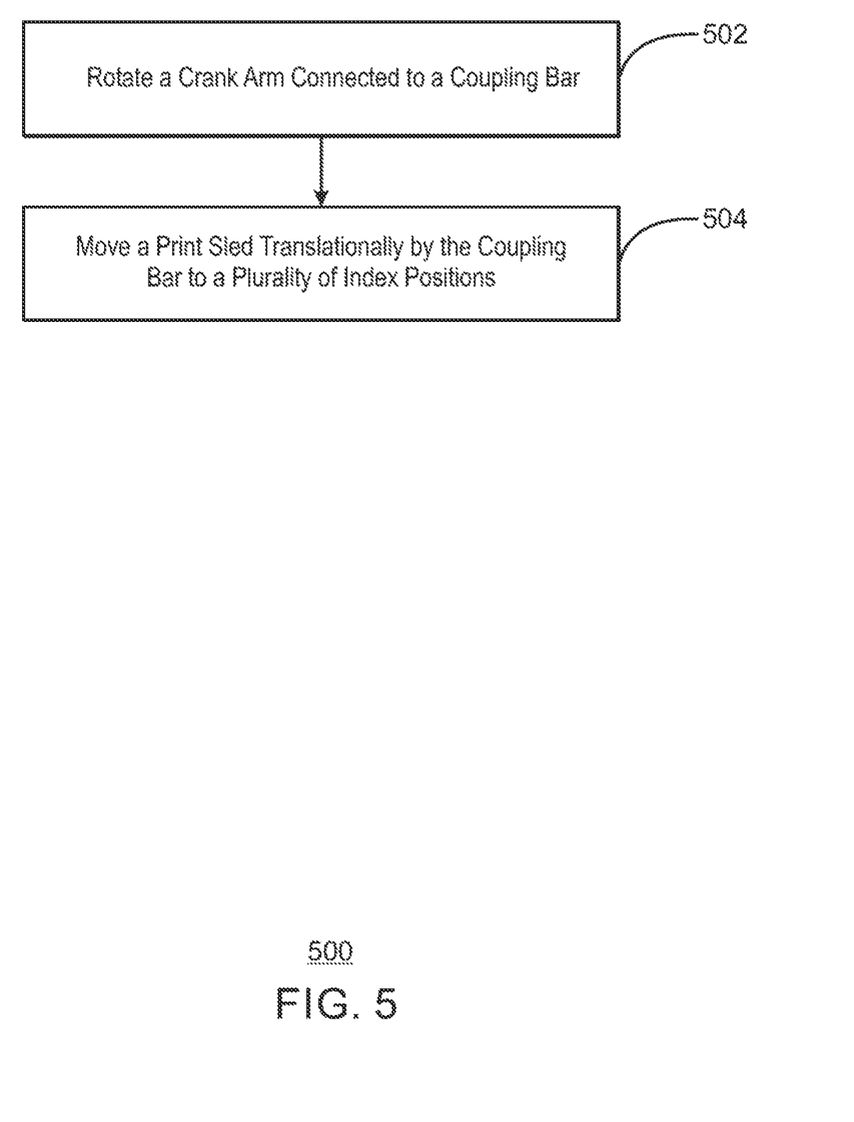
FIG. 5 is a flowchart of an example method for printhead indexing.

FIG. 5 is a flowchart of an example method 500 for printhead indexing. The method shown can be implemented on a computing device 502 of FIG. 5.

At block 502, a crank arm is rotated while connected to a coupling bar. The crank arm rotator may account for feedback received from the printer and incorporate the feedback into the directions provided to the crank arm. Through the movements of the crank arm, the position of the printhead nozzles may be adjusted, both individually and as a group.

At block 504, a print sled is moved translationally by the coupling bar to one of a number of index positions. The print sled in the method 500 may be located in X, Z, and Y orthogonal dimensions, where the print sled is translationally moved in response to rotation of the crank arm. The number of index positions are separately located in a Y dimension with the same Z dimension. In an example, the index positions being moved correspond to bias holder positions that can affect the range of motion of a crank arm.

The method 500 may include further adjusting the index positions for the coupling bar and print sled. As discussed above, the print sled can be located in X, Z, and Y orthogonal dimensions and translationally moved to one of a plurality of index positions by the coupling bar in response to rotation of the crank arm. In an example, the number of index positions are separately located in a Y dimension with the same Z dimension.

The method 500 can include directing the crank arm, coupling bar, and print sled are moved together in an X dimension. The printhead indexer of this method 500 may rotate the crank arm in a Z and Y dimension and keeps the X dimension constant. The print sled can include a plurality of print nozzles spread apart in the Y dimension. The method 500 can including holding the crank arm in place with a bias holder in response to a rotation of the crank arm to the location of the bias holder. The crank arm may also be held against the bias holder with a spring.

In an example, the coupling bar may be rotated in a first direction a circular path comprising a top location of rotation and a bottom location of rotation, and wherein the coupling bar stops rotation at a location past the top location in the first direction of rotation with the coupling bar closer in location to the top location of rotation than the bottom location of rotation. The crank arm rotation can accelerate to a constant rotational velocity and causes a sinusoidal translational velocity of the print sled through the coupling bar. A number of index positions are positioned to align the print sled with a second print sled. In an example, the crank arm can rotate in a first rotational direction and then a second rotational direction.

It is to be understood that the block diagram of FIG. 5 is not intended to indicate that the method 500 is to include all of the actions shown in FIG. 5. Rather, the method 500 can include fewer or additional components not illustrated in FIG. 5.

Figure 6:
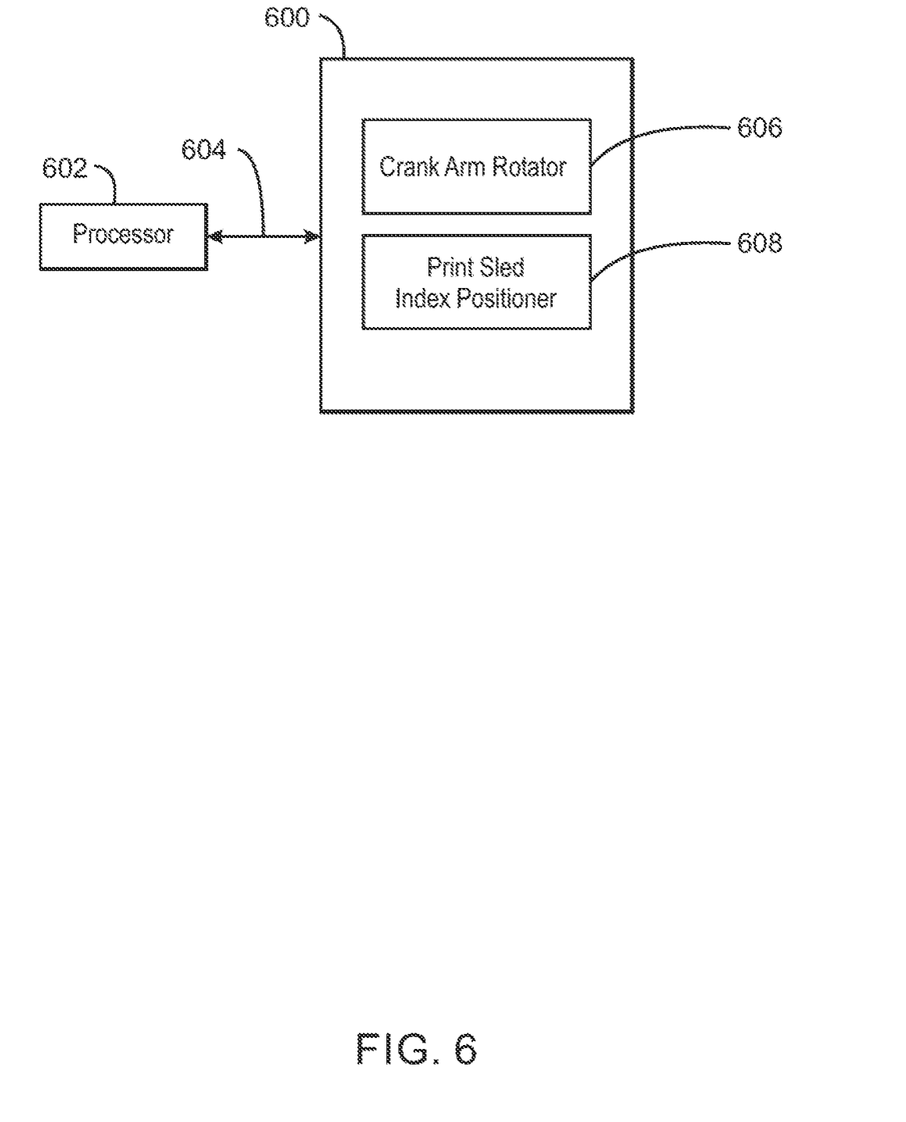
FIG. 6 is a block diagram of an example tangible, non-transitory, computer-readable medium including instructions to direct a processor to index a printhead.

FIG. 6 is a block diagram of an example tangible, non-transitory, computer-readable medium 600 including instructions to direct a processor to index a printhead. The computer readable medium 600 can include the processor 602 to execute instructions received from the computer-readable medium 600. Instructions can be stored in the computer-readable medium 600. These instructions can direct the processor 602 to configure a device to index a printhead between index positions. Instructions can be communicated over a bus 604 as electrical signals, light signals, or any other suitable means of communication for transmission of data in a similar computing environment.

The computer-readable medium 600 includes a crank arm rotator 606 to direct the processor convert motion from a gearbox to the coupling bar through the crank arm. The coupling bar can be used to convert the rotational motion of the crank arm and gearbox to a linear, translational motion.

The computer-readable medium 600 includes a print sled index positioner 608. The pen sled is connected to the coupling bar and is described through in X, Z, and Y orthogonal dimensions. At the instruction of the computer-readable medium, a processor 602 directs the pen sled to move translationally to index positions by the translational motion of the coupling bar. The index positions may be separately located in a Y dimension that hold the Z dimension constant.

In an example, the computer-readable medium 600 can direct the processor to move the crank arm, coupling bar, and print sled together in an X dimension. The processor may be directed by the instructions of the printhead indexer to rotate the crank arm in a Z and Y dimension and keeps the X dimension constant. The print sled can include a plurality of print nozzles spread apart in the Y dimension. In an example the computer-readable medium 600 holds the crank arm in place with a bias holder in response to a rotation of the crank arm to the location of the bias holder. The crank arm may also be held against the bias holder with a spring.

The computer-readable medium 600 may include code that when executed, directs the processor 602 to rotate the coupling bar in a first direction a circular path comprising a top location of rotation and a bottom location of rotation, and wherein the coupling bar stops rotation at a location past the top location in the first direction of rotation with the coupling bar closer in location to the top location of rotation than the bottom location of rotation. The crank arm rotation can accelerate to a constant rotational velocity and causes a sinusoidal translational velocity of the print sled through the coupling bar. A number of index positions are positioned to align the print sled with a second print sled. In an example, the crank arm can rotate in a first rotational direction and then a second rotational direction.

It is to be understood that the block diagram of FIG. 6 is not intended to indicate that the computer-readable medium 600 is to include all of the components shown in FIG. 6. Rather, the computer-readable medium 600 can include fewer or additional components not illustrated in FIG. 6.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A method for printhead indexing comprising:
rotating a crank arm connected to a coupling bar;
moving a print sled translationally by the coupling bar, where the print sled is translationally moved to one of a plurality of index positions by the coupling bar in response to rotation of the crank arm, where the plurality of index positions are separately located in a Y dimension with a same Z dimension.

2. The method of claim 1, wherein the crank arm, coupling bar, and print sled are moved together in an X dimension.

3. The method of claim 1, wherein the crank arm rotates in a Z and Y dimension and keeps an X dimension constant.

4. The method of claim 1, wherein the print sled includes a plurality of print nozzles spread apart in the Y dimension.

5. The method of claim 1, comprising holding the crank arm in place with a bias holder in response to the rotation of the crank arm to the location of the bias holder.

6. The method of claim 5, wherein the crank arm is held against the bias holder with a spring.

7. The method of claim 1, comprising rotating the coupling bar in a first direction a circular path comprising a top location of rotation and a bottom location of rotation, and wherein the coupling bar stops rotation at a location past the top location in the first direction of rotation with the coupling bar closer in location to the top location of rotation than the bottom location of rotation.

8. The method of claim 1, wherein the crank arm rotation accelerates to a constant rotational velocity and causes a sinusoidal translational velocity of the print sled through the coupling bar.

9. The method of claim 1, wherein the plurality of index positions align the print sled with a second print sled.

10. The method of claim 1, wherein the crank arm rotates in a first rotational direction and then a second rotational direction.

11. A printhead indexer device comprising:
a gearbox to provide rotational motion;
a coupling bar to convert the rotational motion of the gearbox to a translational motion; and
a print sled connected to the coupling bar, where the print sled is moved translationally to index positions by the translational motion of the coupling bar, where the index positions are separately located in a Y dimension that hold a Z dimension constant.

12. The device of claim 11, wherein the crank arm rotation accelerates to a constant rotational velocity and causes a sinusoidal translational velocity of the print sled through the coupling bar.

13. The device of claim 11, wherein the coupling bar that rotates in a first direction a circular path comprising a top location of rotation and a bottom location of rotation, and wherein the coupling bar stops rotation at a location past the top location in the first direction of rotation with the coupling bar closer in location to the top location of rotation than the bottom location of rotation.

14. A printhead indexer system comprising:
a processor;
a storage comprising instructions that when executed by the processor instruct a low jerk force applier to apply force;
a coupling bar connecting the low jerk force applier to a print sled, the coupling bar to convert the force applied to the coupling bar into a low jerk movement of the print sled; and
an indexer to index the low jerk force applier at preset locations.

15. The system of claim 14, comprising holding the low jerk force applier in place with a bias holder in response to a rotation of a rotator to the location of the bias holder.

* * * * *